INVENTORS
BARRY L. DICKINSON
DONALD R. CONNOR

United States Patent Office 3,088,379
Patented May 7, 1963

3,088,379
METHOD FOR APPLICATION OF TEAR TAPE
Barry L. Dickinson, New Brunswick, and Donald R. Connor, South Bound Brook, N.J., assignors to Union Carbide Corporation, a corporation of New York
Filed Apr. 13, 1959, Ser. No. 805,776
8 Claims. (Cl. 93—1)

This invention relates to tear tapes for polyethylene film and method for applying tear tapes to polyethylene film and, more particularly, to heat sealable tear tapes for polyethylene film overwrap and method for applying such tear tape to such overwrap film. The invention also relates to polyethylene film overwrap readily removable by means of a heat sealable tear tape.

The use of an attractive and glossy, moisture impermeable, overwrap on packages is widely practiced in the packaging industry. The advent of cellulosic films, particularly cellophane, made possible a host of new packaging techniques which increased the reliability and desirability of a wide variety of packaged consumer goods, particularly cigarettes, cigars, candy and dairy perishables, and stimulated retail sales thereof. It was early found, however, that the very toughness of the cellulosic film which afforded protection caused difficulties in unwrapping which slowed consumer acceptance of the overwrapped packages. Numerous ideas to eliminate the problem were conceived. Many patents relating to means for overcoming unwrapping difficulties encountered with cellulosic film overwrap were issued. Most of the means suggested centered about the use of a "tear tape" or "tear string" usually cellulosic or fibrous in nature, embedded in, or solvent bonded to the cellulosic film substrate which, when pulled by means of a projecting tab, sheared the portion of the film adjacent the tear tape and facilitated the removal of the film overwrap. These methods exploited an inherent tendency in cellulosic film to tear straight once shear was begun.

Hardly had the problem of removing cellulosic film overwrap been solved when new overwrapping and packaging materials, notably thermoplastic films, became known and created new problems. One of the most versatile of the thermoplastic films and one of the most advantageous for packaging overwrap is polyethylene film. A difficulty which has heretofore prevented complete acceptance of polyethylene film, however, is the absence in the art of a successful method of achieving rapid and neat opening of polyethylene film wrapped and overwrapped packages. Polyethylene film is more extensible than cellulosic film and hence does not shear uniformly with known tear tapes and tear tape methods. Whereas cellulosic film shears equally well in any direction and leaves smooth edges on the sides of the tear, polyethylene film shears irregularly, alternately tearing and stretching, resulting in a non-uniformly serrated edge characterized by peaks of badly stretched film and uneven valleys of smoothly sheared film. Adaptation of old techniques successful with cellulosics has proved unsatisfactory. For example, cellulosic film tear tapes have been generally located on the inner surface of the film, i.e., that surface adjacent the wrapped article, with only a tab exposed for grasping and pulling to shear the overwrapped material. Although inwardly facing tear tape location is completely successful with cellulosic film overwrap, it has been found that polyethylene film, due to greater toughness and an inherent extensibility, shears very irregularly when a tear tape is pulled therethrough at a slow rate and only slightly better with a rapid tearing rate. With known tear tapes and tear tape methods, very jagged and unsightly tears across the polyethylene film are obtained.

Bonding of tear tapes or strips to cellulosic film is generally accomplished by the use of solvent adhesives which soften the cellulosic film surface and enable development of a strong bond with the tear tape although weakening the film. The well-known resistance of polyethylene to most common solvents, however, has prevented achieving a bond of sufficient strength with conventional adhesive bonding techniques.

Because presently known methods of bonding tear tapes to film are unsuited to polyethylene film, it has been suggested as an alternative to tear tapes for polyethylene to employ peelable polyethylene films or perforated polyethylene films to enable rapid opening of the overwrap. These techniques, however, reduce the strength and the protectiveness of the polyethylene film and hence are disadvantageous and undesirable.

It is an object, therefore, of our invention to provide a method for opening polyethylene film wrapped articles neatly and easily.

Still another object is to provide a method for applying tear tapes to polyethylene film whereby said film is easily removable from an article wrapped therewith, which method does not adversely affect the polyethylene film.

A further object is to provide a method for easily and neatly opening polyethylene film overwrapped packages, which method does not detract from the appearance or reduce the strength of the overwrap.

These and other objects are accomplished in accordance with our invention by the use of a tear tape laminated to the surface remote to the wrapped article, i.e., the exterior surface of the polyethylene film. The tear tape of our invention consists of a backing material of substantially lower extensibility than the polyethylene film and a coating thereon of a synthetic polymeric thermoplastic resinous material which is heat bondable to the polyethylene film. Lamination of the tear tape to the polyethylene film overwrap is achieved by softening the thermoplastic coating, suitably by subjecting the tear tape to heat, and preferably by heating the uncoated side of the backing and thus indirectly heating and softening the thermoplastic coating thereon and immediately thereafter pressing the exterior surface of the polyethylene film to be used as an overwrap against the softened thermoplastic coated side of the tear tape and laminating the polyethylene film and tear tape together in a bond stronger than either the polyethylene film overwrap or the tear tape. A fuller description of a preferred embodiment of our invention and a preferred method of achieving the same is given hereinbelow in conjunction with the attached drawings wherein:

Figure 1:
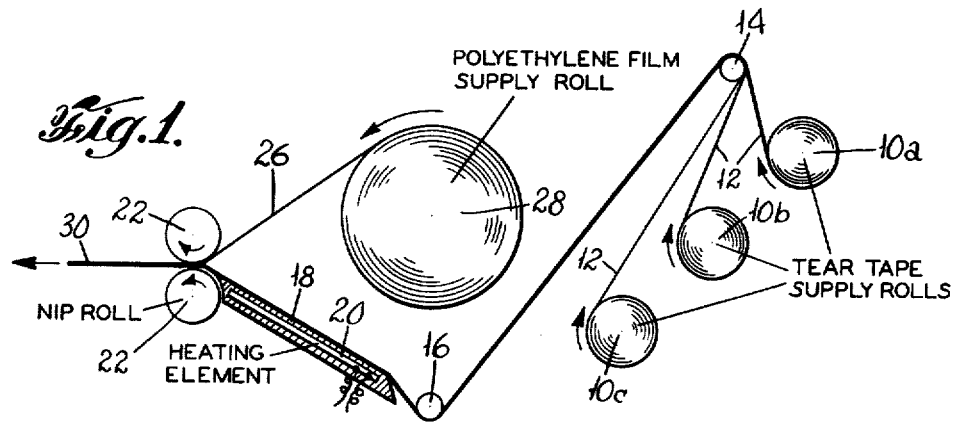
FIGURE 1 is a diagrammatic view of the method of applying tear tape to polyethylene film.

Referring to the drawings, the embodiment comprises in detail three independently mounted supply rolls of tear tape 10a, 10b and 10c, from which rolls one, two or three strips of tear tape 12 can be unwound. We have found it desirable to apply a plurality of strips in parallel with certain polyethylene films as hereinafter explained, hence the plurality of tear tape supply rolls. The tear tape 12 is mechanically drawn from the supply rolls 10a, 10b and 10c; over idler roll 14, the backing side of the tape 12 in contact with said idler roll; under a second idler roll 16, the coated side of the tape 12 in contact therewith; over a heating element comprising a heated bed 18 with heating cartridge 20 inserted therein, by two driver pinch rolls 22.

Suitably the upper roll is made of hard rubber and the lower roll of steel. Polyethylene film 26 is simultaneously drawn into the nip of pinch rolls 22 from film supply roll 28 and is lightly pressed into contact with tear tape 12 in passing between pinch rolls 22. The polyethylene film tear tape laminate product 30 issuing from the nip rolls passes to a windup roll or other suitable collecting arrangement or directly to the packaging, overwrapping or other end-use manufacturing line.

In passing over heated bed 18 the backing of tear tape 12 is heated to a temperature sufficient to soften the thermoplastic coating of the tear tape 12 remote to the surface of heated bed 18, and to render the coating bondable on contact to the polyethylene film 26. Immediately, or at least before the thermoplastic coating loses bonding softness and becomes unbondable to the polyethylene film 26, the tear tape 12 is passed between pinch rolls 22 and is contacted with polyethylene film 26 and bonded firmly thereto to form the laminate 30. The above method for applying tear tape to polyethylene film is a particularly desirable one because it is readily adapted to existing overwrapping machinery. Modifications are of course possible without affecting the critical requirements of our method: (1) softening of the thermoplastic coating until it becomes bondable on contact with polyethylene film and (2) accomplishing actual contact. We have found that use of convex surface on the bed 18 can provide more even heating and better heat transfer from the bed 18 for a given surface area than a planar surfaced bed.

In the embodiment shown in FIGURE 1, the end of the heated bed 18 adjacent the pinch rolls 22 is tapered to permit positioning close to the nip of the rolls. This design allows heating of the tear tape 12 to a point as little as $\frac{1}{16}''$ and less from the nip of the pinch rolls 22. Proximity of the heating means to the actual point of lamination determines, for a given tear tape, the amount of heat which must be applied to the tear tape. It is preferred to employ as little heat as is consistent with the obtaining of strong bonds, both for economy of operation and prevention of degradation of the coating or the backing. With the coated tear tapes of our invention, heating element surface temperatures of as low as 330° F. and up to 390° and 450° F. are suitable. Temperatures in excess of 475° F. are to be avoided with all backing materials. Positioning the heating element from 1 to $\frac{1}{16}$ of an inch from the nip of the rolls is preferred.

The design of the heating element is not restricted to the above-described embodiment. In general, any heating means which controllably supplies sufficient amounts of heat to a designated area to soften without unduly degrading the thermoplastic coating as the tear tape is drawn therepast is suitable. Radiant heating means, flames, hot gases and high frequency dielectric heating apparatus are all suitable heating means. Selected atmospheres can be employed to inhibit degradation of the thermoplastic coating if desired. In no case should such degradation be permitted to occur which will prevent bonding of the tear tape to the polyethylene film.

The exact method of contacting the tear tape with the polyethylene film is not narrowly critical and any apparatus, e.g., a hot wheel can be used. We have, however, found it to be unnecessary to apply heat simultaneously with pressure and disadvantageous as well since puckering of the polyethylene film adjacent the tear tape occurs. Hence, we prefer to heat the thermoplastic coating to its softening point just prior to the establishment of contact. It is critical, however, that the polyethylene film be pressed into contact with the tear tape while the thermoplastic coating of the tear tape is still in a sufficiently softened state to be bondable to the film. We prefer methods which bring about this contact in minimum time and maintain the thermoplastic coating in a highly softened but not flowing state.

Correlative with the temperature employed in the heating element is the rate of speed at which the tear tape is passed through the heating zone. Usually, overwrapping film is used on the manufacturing line at about 40–60 ft./min. We have found tear tapes of this invention can be laminated to polyethylene film in accordance with our invention at rates of from 20–150 ft./min. and higher. The use of longer and/or hotter heating zones permits even greater speeds.

In order to achieve effective tear tape laminates wtih our invention, it is essential that tenacious adhesion of the tear tape coating to the polyethylene film be obtained. Hence, when the coating contacts the polyethylene film, it is critical that it be bondable, i.e., able to tenaciously adhere thereto. The more tightly the laminate layers are secured to one another, that is, the greater the strength in the adhesion developed between the tear tape and the polyethylene film, the more advantageous is our invention. As an absolute minimum, the tear tape coating must adhere to the polyethylene film with sufficient tenacity to ensure shearing of the polyethylene film upon attempted removal of the tear tape therefrom by pulling the tear tape away from the polyethylene film.

Figure 2:
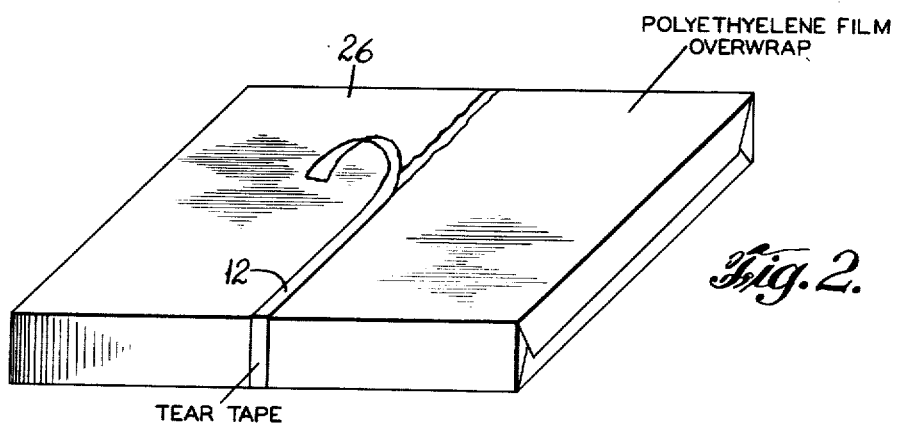
FIGURE 2 is a cabinet projection of a polyethylene film overwrapped package with one tear tape, shown partially torn open.

We have found that tear tape applied in the above-described manner shears polyethylene film easily and neatly because the tear tape is laminated to the exterior surface of the tear tape tab pulls the tear tape through the film. tapes is contrary to the hitherto-known practice of placing the tear tape on the interior surface, whereby lifting of the tear tape tab pulls the tear tape through the film. It was observed that pulling the tear tape from the interior surface of, and hence through the polyethylene film in accordance with prior art teachings usually results in jagged-edged tears with odly shaped peaks and valleys and an unsightly appearance. Therefore, we laminate the tear tape to the exterior surface of the polyethylene film whereby pulling of the tear tape tab lifts the tear tape and the portion of the polyethylene film coterminous therewith from the plane of the overwrap in a neat, nearly straight-edged manner as shown in FIGURE 2, which is more desirable from a reclosure standpoint and more attractive as well.

Figure 3:
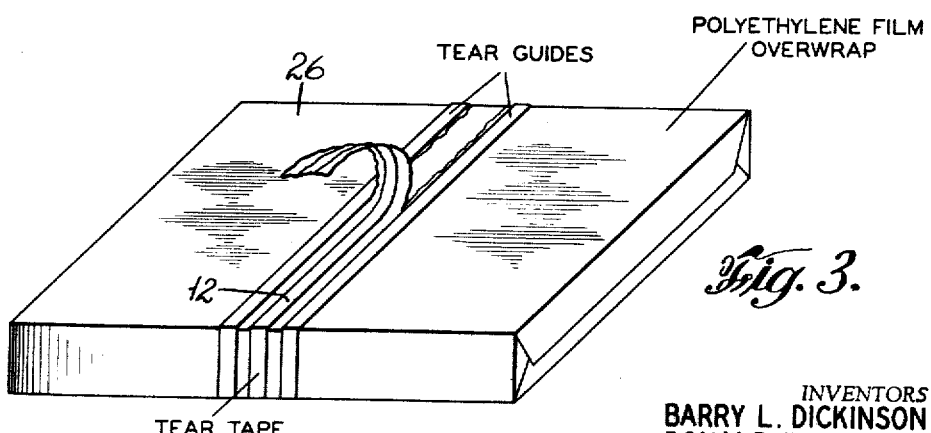
FIGURE 3 is a cabinet projection of a polyethylene film overwrapped package with three parallel tear tapes, shown partially torn open between two guide tabs by the center tear tape.

The obtaining of neat, smooth shearing of the polyethylene film as accomplished with our invention is believed due, to some extent, to molecular orientation of the polyethylene film and to a large extent to an edge effect which we obtain through the use of our laminated tear tape. This "edge effect" as obtained in our invention is the formation of a sharply defined, hard, inflexible area (the laminate) adjacent to a comparatively supple, flexible area (the film) separated by a line or edge along which shear occurs when stress is applied to the tear tape. This edge effect is developed to varying degrees depending inversely on the extensibility, or the inherent tendency of the polyethylene film to distort or stretch elastically under stress. We have found that the stiffer polyethylene films, generally those highly oriented and/or of high density and usually of higher molecular weight, i.e., with densities between about 0.93 and 0.96 and moderately oriented are slightly extensible. Therefore, the edge effect is quite pronounced and a uniformly edged tear is obtained at both rapid and slow rates of shear with the tear tape. On the other hand in lower density, slightly oriented or unoriented polyethylenes, i.e., those having densities below about 0.93 down to about 0.91, and of generally lower molecular weights, the edge effect is less well developed and shear is not as neat. Hence, with the latter-mentioned polyethylenes we have found it highly desirable to employ three parallel tear tapes spaced approximately their own width apart, as shown in FIGURE 3, to minimize random tearing and facilitate shearing of the polyethylene film. It is to be noted that the quality of shear obtained with the tear tapes of our invention is dependent upon the physical characteristics of the polyethylene film to a great extent, other factors such as bond strength, backing strength, film thickness and the like being equal. Characteristics of (1) density and (2)

orientation and to a lesser degree (3) molecular weight are determinative of the suitability of particular tear tapes. Generally speaking: (1) the greater the density, the more easily is the shearing accomplished; (2) the higher the degree of molecular orientation in the direction of shear the easier the shearing; and (3) higher molecular weight polyethylenes shear somewhat better than lower molecular weight polyethylenes at equal density and degree of orientation.

These characteristics are most accurately measured in combination by the "extensibility" of the polyethylene film in question. This property, defined above as the tendency inherent in the film to stretch elastically and distort easily under an applied stress, offers an index to the tensile strength of the film as related to shearing by a tear tape. It is critical in our invention to employ a tear tape which exceeds the film in strength and resistance to shear, i.e., is less extensible. Of course, the wider the margin of lower extensibility of the tear tape as compared with the film, the more suitable the tear tape, other factors such as cost and ease of application being equal. The exact percentage of lower extensibility is not narrowly critical but should in every case be lower by at least 10%. Cellophane is an excellent tear tape backing because of its high resistance to shear and very low, practically negligible extensibility when subjected to a pulling stress. Other slightly extensible materials, preferred as a backing for our tear tapes in addition to cellophane and equivalent cellulosics, include Mylar (registered trademark for polyethylene terephthalate) and polycarbonate films. Other flexible materials which are lower in extensibility by at least 10% than the polyethylene film used as a wrapping for packaged articles are included within the scope of our invention, provided the materials can be coated with a thermoplastic which is heat bondable to polyethylene, as are the above-mentioned backing materials. It is evident that good adhesion of the coating is as essential to the backing as it is to the polyethylene film.

The coating on the tear tape backing can be any synthetic, polymeric, thermoplastic resin which is bondable or sealable to polyethylene film to form a strongly adhesive bond, by direct or indirect application of heat. Suitable resins are those which soften at a temperature below the softening temperature of the backing and can be coated thereon in thin layers, for although there is no intrinsic limit on coating thickness, minimum thickness is preferred by the art. In general, the degree of adhesion to the polyethylene must be sufficient to insure that once the polyethylene-tear tape laminate has been formed, removal of the tear tape shears the polyethylene film on either side of the laminate. Copolymers and homopolymers of olefins, especially of ethylene, are particularly suitable as the thermoplastic coating. We particularly prefer polyethylene itself, and, of available polyethylenes, the resin having a density between about 0.96 and 0.91, especially of 0.918 and a melt index of 2 or thereabout.

The following examples are presented to further illustrate our invention:

EXAMPLE 1

One two-mil-thick x ³⁄₃₂" wide strip of Mylar was extrusion coated on one side of with one mil thick 0.918 density polyethylene and was drawn from a supply roll over a heating element, coated side up, by a pair of driver pinch rolls as shown in FIGURE 1 at the rate of 50 ft./min. The heating element was a machined aluminum block 1" x 1" x 7" with a 1000 watt heating cartridge therein. The block was heated to a temperature of 425° F. on the surface and positioned ¼" away from the pinch rolls. One mil thick clear film of 0.930 density polyethylene was pressed against the coated side of the Mylar strip which had been softened by passing along the longitudinal axis of the heating element maintaining constant contact therewith. Inspection of the laminate revealed the absence of distortion or puckering of the polyethylene film surface both beneath the Mylar strip and adjacent thereto and indicated excellent adhesion. To determine the shearing efficiency of the tear tape, the polyethylene film was notched ¹⁄₁₆" on either side of the tear tape to form a tab by which the tape was then pulled. Successive trials were carried out, first with the tear tape on the polyethylene surface away from the direction of application of stress, i.e., on the inner surface, and then with the tear tape on the polyethylene surface facing in the direction of stress, i.e., the exterior surface. In the first case, pulling the tear tape through the polyethylene film, ragged, unsightly edges resulted, especially at slow rates of pull. In the second case, pulling the tear tape from the same surface as that to which the tape had been laminated, even-edged smooth shearing was the result at both fast and slow rates of pull.

EXAMPLES 2–9

Additional examples are here given illustrating the effect of variations in density and thickness of polyethylene film and of the distances between the end of the heating element bed and the nip of the pinch rolls. In all examples a two-mil-thick strip of Mylar ³⁄₃₂" wide and coated with 1 mil of 0.918 density polyethylene was used. In Examples 2, 3 and 4, three of these tear tape strips were applied in parallel, ¹⁄₁₆" apart, and the polyethylene film was torn by lifting the center strip.

*Table*

| Example Number | Web Speed, ft./min. | Heating Element Temperature, °F. | Polyethylene Film to Which Tape was Applied | Distance From Pinch Rolls to Heating Element, inches | Adhesion, Tape to Film | Shearing Action |
|---|---|---|---|---|---|---|
| 2 | 50 | 425 | Density, 0.918, 1½ mil. | 1 | Poor | None. |
| 3 | 50 | 425 | ----do---- | ½ | ---do--- | Do. |
| 4 | 50 | 425 | ----do---- | ¹⁄₁₆ | Good | Poor. |
| 5 | 50 | 425 | Density, 0.930, 1 mil thick. | ½ | ---do--- | Do. |
| 6 | 50 | 425 | ----do---- | ¹⁄₁₆ | ---do--- | Good. |
| 7 | 50 | 425 | Density, 0.930, 2 mil thick. | 1 | ---do--- | Do. |
| 8 | 50 | 425 | ----do---- | ½ | ---do--- | Do. |
| 9 | 50 | 425 | ----do---- | ¹⁄₁₆ | ---do--- | Do. |

Examination of the data above shows clearly the deleterious effect of reduced softness of the thermoplastic coating during lamination which is brought about by increasing the distance from the heating element to the nip of the pinch rolls. Also shown is that a distance of ¹⁄₁₆" is the best of the distances tested. By extrapolation it can be surmised that further shortening of the distance would be even more desirable. It is apparent that at a given distance the higher density film was better adhered to and that the thicker higher density films underwent shear better. This behavioral trend was explained by the edge effect referred to above.

What is claimed is:

1. Method for applying tear tape to a polyethylene film suitable for wrapping articles including the steps of drawing from a supply roll a tear tape fabricated from a backing material possessing a lower extensibility than said polyethylene film and a synthetic thermoplastic resinous coating heat bondable to said polyethylene film and having a softening point below that of said backing material, passing said tape to a heating zone, softening said synthetic thermoplastic resinous coating, and immediately thereafter contacting said synthetic resinous coating while in a softened condition with said polyethylene film to form a laminate of said tear tape and said polyethylene film.

2. Method as claimed in claim 1 wherein said synthetic thermoplastic resinous coating is heated to a temperature between about 330 and 450° F. immediately prior to contact with said polyethylene film.

3. Method as claimed in claim 1 wherein said heating zone comprises a heated bed over which said tear tape backing passes in moving contact.

4. Method as claimed in claim 1 wherein said synthetic thermoplastic resinous coating is polyethylene.

5. Method for applying tear tape to a polyethylene substrate including the steps of passing through a heating zone a tear tape fabricated from a backing material possessing a lower extensibility than said polyethylene substrate and a synthetic thermoplastic resinous coating heat bondable to said polyethylene substrate and having a softening point below that of said backing material, softening said synthetic resinous coating, and immediately thereafter contacting said synthetic resinous coating while in a softened condition with said polyethylene substrate to form a laminate of said tear tape and said polyethylene substrate.

6. Method as claimed in claim 5 wherein said synthetic thermoplastic resinous coating is heated to a temperature between about 330 and 450° F. immediately prior to contact with said polyethylene film.

7. Method as claimed in claim 5 wherein said heating zone comprises a heated bed over which said tear tape backing passes in moving contact.

8. Method as claimed in claim 5 wherein said synthetic thermoplastic resinous coating is polyethylene.

References Cited in the file of this patent

UNITED STATES PATENTS

| | | |
|---|---|---|
| 2,141,252 | Prindle | Dec. 27, 1938 |
| 2,165,289 | Milmore et al. | July 11, 1939 |
| 2,334,381 | Brononder | Nov. 16, 1943 |
| 2,360,845 | Brononder | Oct. 24, 1944 |
| 2,554,160 | Von Gunten | May 22, 1951 |
| 2,699,285 | Bell | Jan. 11, 1955 |
| 2,768,561 | Clemente et al. | Oct. 30, 1956 |

OTHER REFERENCES

Periodicals: Modern Packaging, January 1958, p. 130; December 1957, p. 98; February 1958, "A Tape That Tears Polyethylene."

UNITED STATES PATENT OFFICE
CERTIFICATE OF CORRECTION

Patent No. 3,088,379 May 7, 1963

Barry L. Dickinson et al.

It is hereby certified that error appears in the above numbered patent requiring correction and that the said Letters Patent should read as corrected below.

Column 4, line 25, for "of the tear tape tab pulls the tear tape through the film." read -- of the polyethylene film. Exterior bonding of the tear --; line 32, for "odly" read -- oddly --; column 6, line 6, strike out "of".

Signed and sealed this 10th day of December 1963.

(SEAL)
Attest:

ERNEST W. SWIDER

Attesting Officer

EDWIN L. REYNOLDS

Acting Commissioner of Patents